United States Patent
Duri et al.

(10) Patent No.: US 8,364,530 B2
(45) Date of Patent: Jan. 29, 2013

(54) METHODS AND APPARATUS FOR PRESENTING PERSONALIZED INFORMATION TO CONSUMERS IN A RETAIL ENVIRONMENT

(75) Inventors: Sastry S. Duri, Yorktown Heights, NY (US); Jeffrey G. Elliott, Danbury, CT (US); Jennifer C. Lai, Garrison, NY (US); Xuan Liu, Yorktown Heights, NY (US); Paul A. Moskowitz, Yorktown Heights, NY (US); Jung-Mu Tang, South Salem, NY (US); Todd C. Werden, Sandy Hook, CT (US); Danny Chan-Yong Wong, Allendale, NJ (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 859 days.

(21) Appl. No.: 12/127,101

(22) Filed: May 27, 2008

(65) Prior Publication Data
US 2008/0228585 A1      Sep. 18, 2008

Related U.S. Application Data

(63) Continuation of application No. 10/917,967, filed on Aug. 13, 2004, now abandoned.

(51) Int. Cl.
*G06Q 30/00*        (2012.01)
(52) U.S. Cl. .................................. 705/14.41; 340/572.1
(58) Field of Classification Search .......................... None
See application file for complete search history.

(56) References Cited

U.S. PATENT DOCUMENTS

| | | | |
|---|---|---|---|
| 3,667,450 A | 6/1972 | Skafte | 126/85 B |
| 4,827,395 A | 5/1989 | Anders et al. | 700/9 |
| 5,428,778 A | 6/1995 | Brookes | 707/5 |
| 5,597,995 A | 1/1997 | Williams et al. | 235/375 |
| 5,930,145 A | 7/1999 | Yuyama et al. | 700/231 |
| 6,025,780 A | 2/2000 | Bowers et al. | 340/572.3 |
| 6,108,645 A | 8/2000 | Eichstaedt et al. | 707/1 |
| 6,507,279 B2 * | 1/2003 | Loof | 340/572.1 |
| 6,513,015 B2 * | 1/2003 | Ogasawara | 705/26 |
| 6,539,281 B2 | 3/2003 | Wan et al. | 700/236 |
| 6,587,835 B1 * | 7/2003 | Treyz et al. | 705/14 |

OTHER PUBLICATIONS http://www.priority1design.com.au/rfid_design.html.*

* cited by examiner

*Primary Examiner* — Namrata Boveja
(74) *Attorney, Agent, or Firm* — Patterson & Sheridan, LLP

(57) ABSTRACT

Methods and apparatus are provided for presenting personalized information to consumers in a retail environment. A personalized price is determined for at least one product that is in physical proximity to the customer. The physical proximity may be determined, for example, by evaluating identifiers, such as RFID tags, associated with each customer and product. A personalized message can be also presented to a customer regarding at least one product that is in physical proximity to the customer. The personalized message can provide, for example, dietary or safety information relevant to the customer and at least one product in the proximity of the customer. The personalized information may be determined based on one or more personalized message rules.

25 Claims, 6 Drawing Sheets

FIG. 3

USER DATABASE – 300

| CUSTOMER IDENTIFIER | CUSTOMER NAME | PURCHASE HISTORY | CREDIT RATING | PREFERENCES |
|---|---|---|---|---|
| 350 | 360 | 370 | 380 | 390 |
| 301 | | | | |
| 302 | | | | |
| ⋮ | ⋮ | ⋮ | ⋮ | ⋮ |
| 310 | | | | |

FIG. 4

PRODUCT DATABASE – 400

| PRODUCT IDENTIFIER | DEFAULT PRICE | CAUTIONS |
|---|---|---|
| 450 | 460 | 480 |
| 401 | | |
| 402 | | |
| ⋮ | ⋮ | ⋮ |
| 410 | | |

FIG. 5
PERSONALIZATION RULEBASE – 500

| TRIGGER CONDITIONS | ACTION |
|---|---|
| 501 — PRODUCT IS ONE OF {A, C, F, G,...Z} AND CUSTOMER IS MEMBER OF LOYALTY PROGRAM | DISPLAY PRODUCT WITH 10% OFF DEFAULT PRODUCT PRICE |
| 502 — CUSTOMER PURCHASES EACH OF PRODUCTS A, B AND C | DISPLAY PRODUCTS A, B, C WITH $1.00 OFF EACH DEFAULT PRODUCT PRICE |
| 503 — CUSTOMER HAS PRODUCT A IN CART | DISPLAY PROMOTION TO CUSTOMER "ALSO PURCHASE PRODUCT B AND SAVE 5%"; DISPLAY PRODUCT B AT DISCOUNTED PRICE |
| 504 — CUSTOMER HAS CREDIT RATING SCORE ABOVE 90 | DISPLAY PROMOTION TO CUSTOMER "PURCHASE PRODUCT F TODAY AND SAVE 15%"; DISPLAY PRODUCT F AT DISCOUNTED PRICE |
| 505 — CUSTOMER HAS PREVIOUSLY PURCHASED PRODUCT Q | DISPLAY PROMOTION TO CUSTOMER "PURCHASE PRODUCT R TODAY AND SAVE $5"; DISPLAY PRODUCT R AT DISCOUNTED PRICE |
| ... | ... |
| 509 — CUSTOMER HAS PEANUT ALLERGY AND PLACES PRODUCT A CONTAINING PEANUTS IN SHOPPING CART | DISPLAY WARNING TO CUSTOMER "CAUTION PRODUCT A CONTAINS PEANUTS!!" |
| 510 — CUSTOMER HAS INTEREST IN TRIATHALONS | DISPLAY MESSAGE TO CUSTOMER THAT CURRENT ISSUE OF X MAGAZINE ON ADJACENT SHELF HAS SEVERAL ARTICLES ON TRIATHALONS |

US 8,364,530 B2

METHODS AND APPARATUS FOR PRESENTING PERSONALIZED INFORMATION TO CONSUMERS IN A RETAIL ENVIRONMENT

CROSS-REFERENCE TO RELATED APPLICATIONS

This application is a continuation of U.S. patent application Ser. No. 10/917,967, filed Aug. 13, 2004 now abandoned, incorporated by reference herein.

FIELD OF THE INVENTION

The present invention relates to techniques for presenting information, such as marketing information, to individuals and, more particularly, relates to techniques for presenting personalized information, such as personalized pricing, messages and safety warnings, to consumers in a retail environment.

BACKGROUND OF THE INVENTION

Marketers constantly attempt to reach consumers with current, personalized marketing information. In an online retailing environment, for example, it is often possible for a web site to identify a returning customer using well-known "cookies" that were previously stored on the customer's computer. Once identified, it is possible to greet the customer by name and present the returning customer with personalized marketing information. For example, the web site can present marketing information that is based on the customer's prior purchases or stated interests.

In a traditional "bricks and mortar" retailing environment, however, it is often more difficult to present customers with personalized marketing information. In a small retailing environment, it may be possible for store employees to greet a frequent customer by name. Even for a recognized customer, however, it is not practical for store employees to follow the customer through the store to present personalized marketing information. Thus, there is currently no effective mechanism for automatically presenting personalized information to a customer in a traditional retail environment.

Another challenge for traditional retailers is the pricing of products and the display of pricing information. If a retailer has a loyalty card program or other special promotions that create multiple price levels for the same product, the retailer must display the different applicable prices. To further complicate matters, in the case of a discount that applies only if the customer buys a combination of selected products, final product pricing cannot be determined until the customer has finished their purchases. Therefore, the customer won't know the actual price of each item until the cashier processes the transaction. Furthermore, even though most retailers have extensive information about individual customers, they cannot effectively change their prices on an individual basis at the point of purchase. The ability of online retailers to personalize pricing and marketing information provides a competitive advantage.

A need therefore exists for a method and apparatus for presenting personalized information, such as personalized messages or safety warnings, to a customer in a traditional retail environment. A further need exists for a method and apparatus for presenting personalized prices to a customer in a traditional retail environment.

SUMMARY OF THE INVENTION

Generally, methods and apparatus are provided for presenting personalized information to consumers in a retail environment. According to one aspect of the invention, a personalized price is determined for at least one product that is in physical proximity to the customer. The physical proximity may be determined, for example, by evaluating identifiers, such as RFID tags, associated with each customer and product. In a further variation, a physical location of a customer may be determined based on biometric information.

According to another aspect of the invention, a personalized message is determined to present to a customer regarding at least one product that is in physical proximity to the customer. The personalized message can provide, for example, dietary or safety information relevant to the customer and at least one product in the proximity of the customer.

The personalized information provided by the present invention may be determined, for example, based on one or more personalized message rules. The personalized message rules may include one or more trigger conditions and a corresponding personalized message. The personalized message may be based on one or more attributes of the customer or product (or both).

A more complete understanding of the present invention, as well as further features and advantages of the present invention, will be obtained by reference to the following detailed description and drawings.

BRIEF DESCRIPTION OF THE DRAWINGS

FIG. 3 is a sample table from an exemplary customer database of FIG. 2;

FIG. 4 is a sample table from an exemplary product database of FIG. 2;

FIG. 5 is a sample table from an exemplary personalization rulebase of FIG. 2;

DETAILED DESCRIPTION OF PREFERRED EMBODIMENTS

Figure 1:
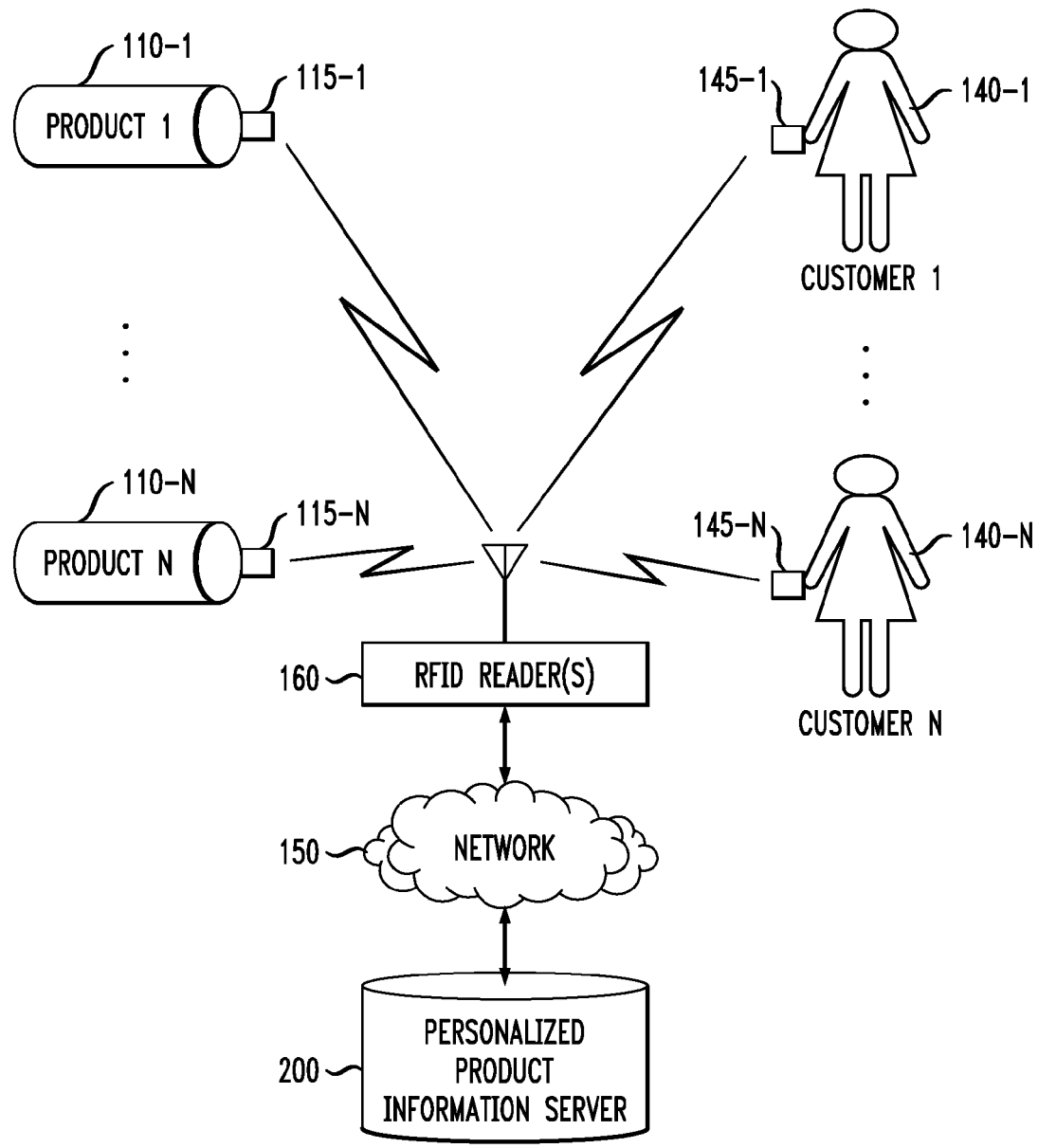
FIG. 1 is a schematic block diagram of a network environment in which the present invention can operate.

The present invention provides personalized information to one or more customers 140-1 through 40-N (140-N) (hereinafter, collectively referred to as customers 140) regarding one or more products 110-1 through 110-N (hereinafter, collectively referred to as products 110) that are within the physical proximity of the customer 140. As used herein, the term "physical proximity" may be defined, for example, in terms of physical contact, a specified distance threshold, within the field of the same RFID reader 160, or as a sector, section or aisle of a retail location, such that customers and products in the same sector are said to be within physical proximity of each other.

The location of each customer 140 may be determined, for example, using a device carried by the customer 140, such as an RFID tag 145-1 through 145-N associated with each customer 140, or through biometric means, such as computer vision techniques to recognize customers 140. The RFID tag 145-1 through 145-N may be embodied, for example, as a smart chip embedded in a loyalty program card or credit card. Each RFID tag 145 is configured to return a unique identification (ID) number when the RFID tag 145 is interrogated by one or more base station readers 160. As discussed hereinafter, the reader 160 is in turn connected to a personalized product information server 200, discussed further below in conjunction with FIG. 2, which may process the information that is returned by the RFID tag 145. The identification device 160 may be an RFID reader, a bar code scanner or a camera which is used to recognize the customers or product labels.

The location of each product 110 may be determined, for example, using an RFID tag 115-1 through 115-N associated with each product 110, or a bar code associated with each product. A unique RFID tag 115 may be affixed to each unit of a given product, or a single RFID tag 115 can be provided for multiple units of a given product, for example, by mounting an RFID tag 115 on the shelf or pallet where the product is stored. A hierarchy could also be defined to accommodate multiple-level packaging. For example, RFID tags 115 could be affixed to individual pairs of socks as well as to the package of three pairs of socks, so that pricing and inventory may be applied at any level. In a further variation, the location of each product 110 may be determined based on a mapping of the floor space of the retail environment, such that if the location of a customer 140 within the retail environment is known, the products 110 in the vicinity of the customer 140 can be identified.

The product RFID tags 115-1 through 115-N may optionally include a display for presenting pricing and additional information to a customer 140. The product RFID tags 115-1 through 115-N may be embodied as the RFID display tags commercially available from Telepanel, Inc. The displays can normally present default pricing, as discussed further below in conjunction with FIG. 3. In addition, according to one aspect of the present invention, when a customer 140 is determined to be in proximity to a given product 110, an association would be made between the particular customer 140 and the product 110. The present invention would then determine whether any personalized message or pricing is applicable for the particular customer 140 and product 110. If applicable, a personalized message and/or price would be sent to the product 110 using the RFID network 150 and the correct personalized price would be presented to the customer 140. The network 150 may be embodied as any combination of wired or wireless technologies.

Figure 2:
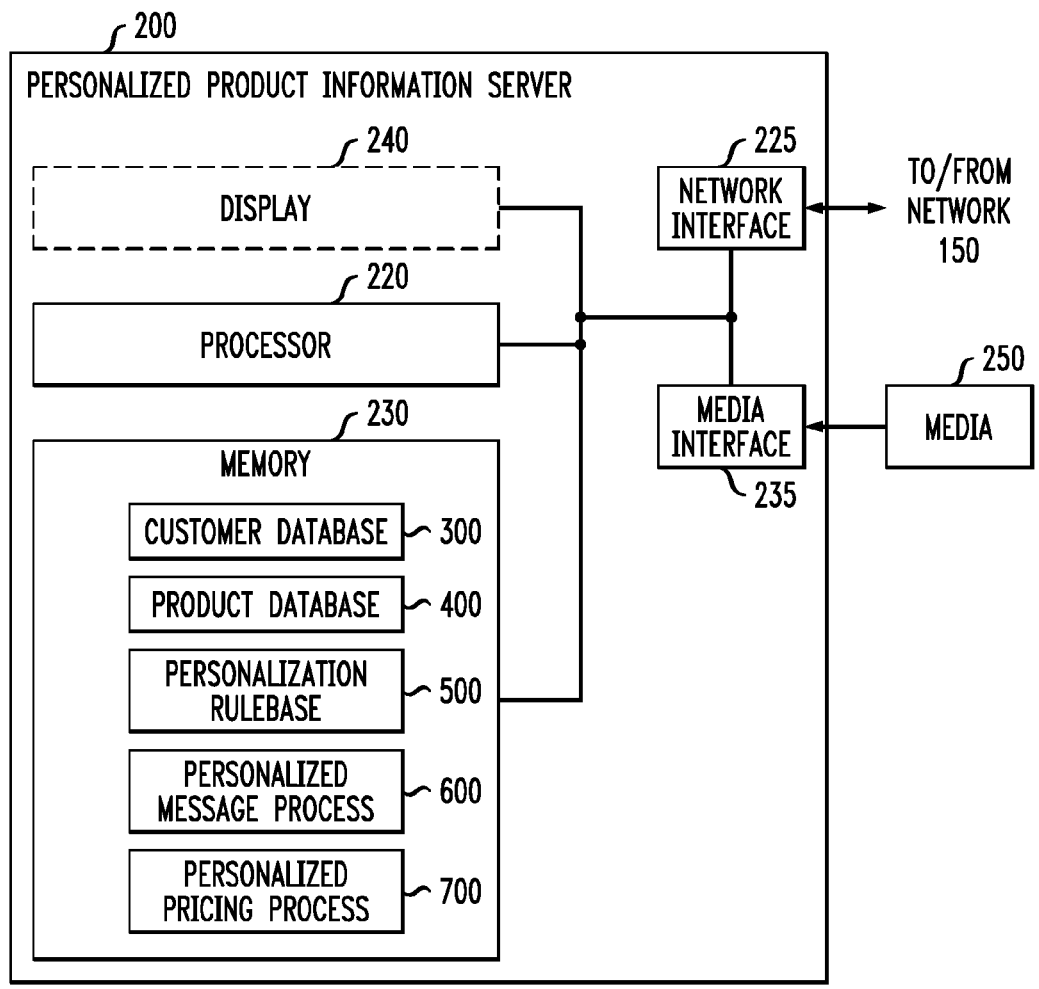
FIG. 2 is a schematic block diagram of the personalized product information server of FIG. 1 in further detail.

FIG. 2 is a diagram illustrating an exemplary personalized product information server 200. The personalized product information server 200 is a computer system that interacts with media 250. The personalized product information server 200 comprises a processor 220, a network interface 225, a memory 230, a media interface 235 and an optional display 240 Network interface 225 allows computer system 210 to connect to a network, while media interface 235 allows computer system 210 to interact with media 250, such as a Digital Versatile Disk (DVD) or a hard drive.

As shown in FIG. 2 and discussed further below in conjunction with FIGS. 3 through 5, the memory 230 stores a customer database 300, a product database 400 and a personalization rulebase 500. As is known in the art, the methods and apparatus discussed herein may be distributed as an article of manufacture that itself comprises a computer-readable medium having computer-readable code means embodied thereon. The computer-readable program code means is operable, in conjunction with a computer system such as the personalized product information server 200, to carry out all or some of the steps to perform one or more of the methods or create the apparatus discussed herein. For example, as discussed further below in conjunction with FIGS. 6 and 7, the computer-readable code is configured to implement a personalized message process 600 and a personalized pricing process 700.

The computer-readable medium may be a recordable medium (e.g., floppy disks, hard drive, optical disks such as a DVD, or memory cards) or may be a transmission medium (e g, a network comprising fiber-optics, the world-wide web, cables, or a wireless channel using time-division multiple access, code-division multiple access, or other radio-frequency channel) Any medium known or developed that can store information suitable for use with a computer system may be used. The computer-readable code means is any mechanism for allowing a computer to read instructions and data, such as magnetic variations on a magnetic medium or height variations on the surface of a compact disk.

Memory 230 configures the processor 220 to implement the methods, steps, and functions disclosed herein. The memory 230 could be distributed or local and the processor 220 could be distributed or singular. The memory 230 could be implemented as an electrical, magnetic or optical memory, or any combination of these or other types of storage devices. Moreover, the term "memory" should be construed broadly enough to encompass any information able to be read from or written to an address in the addressable space accessed by processor 220. With this definition, information on a network, accessible through network interface 225, is still within memory 230 because the processor 220 can retrieve the information from the network. It should be noted that each distributed processor that makes up processor 220 generally contains its own addressable memory space. It should also be noted that some or all of computer system 210 can be incorporated into an application-specific or general-use integrated circuit.

Optional video display 240 is any type of video display suitable for interacting with a human user of apparatus 200. Generally, video display 240 is a computer monitor or other similar video display.

FIG. 3 is a sample table from an exemplary customer database 300 of FIG. 2. The customer database 300 records information for each customer. As shown in FIG. 3, the customer database 300 is comprised of a plurality of records 301-310, each associated with a different customer. In one illustrative embodiment, for each customer identified in field 350, the customer database 300 provides the customer name, purchase history, credit rating, and preferences in fields 360, 370, 380 and 390, respectively.

For example, the purchase history indicated in field 370 may be stored as a vector containing a binary value indicating whether a customer has ever purchased each potential item, or a counter indicating a number of times a customer has purchased each potential item or item category. The preferences indicated in field 390 may store certain preferences, such as special dietary needs or limitations, that are used to trigger various personalization rules 500, as discussed further below in conjunction with FIG. 5. The dietary needs or limitations may be based, for example, on religious or philosophical food requirements, such as a vegetarian. In addition, the preferences stored in field 390 may store other preferences, such as sizes or color preferences for clothing. The preferences stored in field 390 may also include travel preferences, such room preferences for a hotel, or seat or meal preferences for an airline flight.

In a further variation, sub-accounts may optionally be created in the customer database 300. For example, if a "head of household" purchases for an entire family, sub-accounts can optionally be established for each family member to differentiate the preferences of each person. The user preference information stored in the customer database 300 can optionally be automatically adjusted based on a status change. For example, the clothing size or food recommendations for a child may vary with age. In a further variation, food restrictions may vary by date, for example, during a religious holiday, such that certain food restriction are only active during certain periods (such as "no meat" for a Roman Catholic customer during Lent).

FIG. 4 is a sample table from an exemplary product database 400 of FIG. 2. The product database 400 records information for each product sold by a retailer. As shown in FIG. 4, the product database 400 is comprised of a plurality of records 401-410, each associated with a different product. In one illustrative embodiment, for each product identified in field 450, the product database 400 provides a default price and cautionary information in fields 460 and 480, respectively.

For example, the default price indicated in field 460 may be presented to the customer 140 unless a personalized price is applicable, based on one or more personalization rules 500 (FIG. 5). The cautionary information recorded in field 480 may store certain product information, such as dietary warnings, that are used to trigger various personalization rules 500, as discussed further below in conjunction with FIG. 5

The product database 400 can optionally accommodate any type of discount, including a percentage discount, a monetary discount (dollars off), or other discounts, such as "buy one get one free," buy one product and get a discount on a second product Many of these discount and pricing mechanisms are available in today's retail store computer systems and are well understood by those of ordinary skill in the art.

The display can optionally show the default price as well as any applicable personalized pricing, such as "was $1 99 now $1 25," "your savings are xx," "compare at" or other promotional messages.

FIG. 5 is a sample table from an exemplary personalization rulebase 500 of FIG. 2. The personalization rulebase 500 stores one or more personalization rates that are used to provide personalized messages or prices to customers 140 that are in physical proximity to certain products 110. The content and format of the personalization rules 500 can take any suitable form, as would be apparent to a person of ordinary skill. In addition, the rule-based implementation of the exemplary embodiment is merely meant to illustrate the scope and spirit of the present invention.

As shown in FIG. 5, the exemplary personalization rulebase 500 stores a number of illustrative personalization rules in fields 501 through 510. In the exemplary embodiment, the personalization rulebase 500 contains a set 520 of personalized pricing rules and a set 530 of personalized message rules. For each personalization rule, the personalization rulebase 500 stores the trigger conditions in field 550 and the corresponding action in field 560 that should be taken when the rule is satisfied.

For example, the personalized price rule stored in record 502 requires that a customer 140 purchases three products, A, B and C, in order to qualify for a discount As the customer 140 shops and individually collects the three products, the default pricing may be displayed until the customer 140 has collected all three products. Once the customer 140 has placed the necessary products in his or her shopping cart to satisfy the rule, the personalized pricing can be displayed on each product with the applicable discount In this manner, the product prices can continuously be updated based on other purchases to allow discounts to be given as certain combinations of products are selected.

Various personalized message rules 530 can be defined to ensure that customers 140 do not inadvertently purchase products that are inappropriate for the customer, such as the wrong size or inconsistent with dietary needs of the customer. In addition, personalized message rules 530 can be defined to check a consumer profile, e.g., allergy to a specific medicine or food type, against the products in the proximity of the customer Further personalized message rules 530 can be defined to issue reminders based on past purchases, such as a message indicating to a customer that he or she purchased a 30 day supply of a given vitamin last month and it may be time to purchase additional vitamins, or a message indicating that a previously rented or borrowed item is overdue.

When a customer 140 is in physical proximity to various products, the present invention automatically checks the products 110 against the customer's preferences as well as any registered needs and allergies. If there is a mismatch or the customer is selecting an inappropriate item, an alert can be given to the customer The customer can then do a detailed lookup to find out the details of the mismatch on some personal device, such as a cellular telephone or personal digital assistant (PDA). In this manner, information for each customer and item that are in physical proximity can be compared and appropriate personalized product messages, such as personalized pricing, marketing messages or safety messages, can be presented to the customer.

For example, a pharmacy can deploy the present invention to verify the safety of drugs and other products that are in the physical proximity of a customer. For example, the pharmacy can ensure that a new product does not cause adverse reactions or conflicts with other drags or products being used by the customer. The application can compile drug profiles and customer profiles and compare them to determine if the current products cause adverse reactions.

The present invention optionally incorporates privacy protection features for the identification and preference information. The personal identification information is optionally protected from being read by malicious readers. In addition, the registry information containing personal information can also be protected.

The personalized information provided in accordance with the present invention can be a service provided to customers for free or with a subscription fee. For example, the service can be provided free if the consumer allows the purchase history information to be used by the registry.

Figure 6:
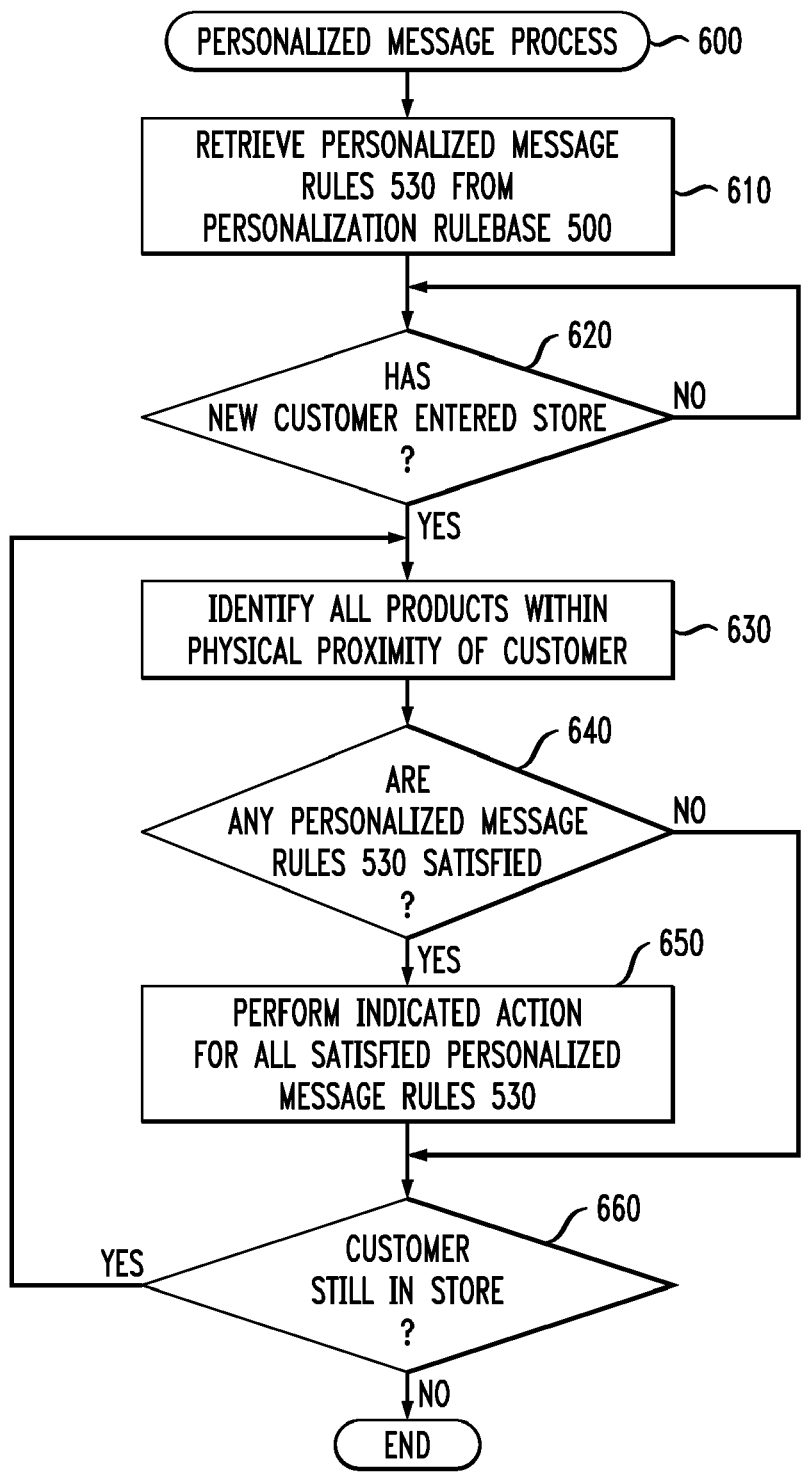
FIG. 6 is a flow chart describing an exemplary implementation of a personalized message process incorporating features of the present invention.

FIG. 6 is a flow chart describing an exemplary implementation of a personalized message process 600 incorporating features of the present invention. The personalized message process 600 presents applicable personalized messages to customers 140 that are in physical proximity to certain products 110. As shown in FIG. 6, the personalized message process 600 initially retrieves the personalized message rules 530 from the personalization rulebase 500 (FIG. 5) during step 610. A test is performed during step 620 to determine if a new customer has entered the store. Once it is determined during step 620 that a new customer has entered the store, then all products within the physical proximity of the customer are continuously identified during step 630 (as the customer proceeds through the store).

A test is performed during step 640 to determine if there are any personalized message rules 530 that are satisfied. If there are no satisfied personalized message rules 530, program flow proceeds to step 660, discussed below.

If there are one or more satisfied personalized message rules 530, the indicated action for all satisfied personalized message rates 530 are implemented during step 650. A further test is performed during step 660 to determine if the customer is still in the store. If the customer is still in the store, program control returns to step 630. If the customer is no longer in the store, program control terminates.

Figure 7:
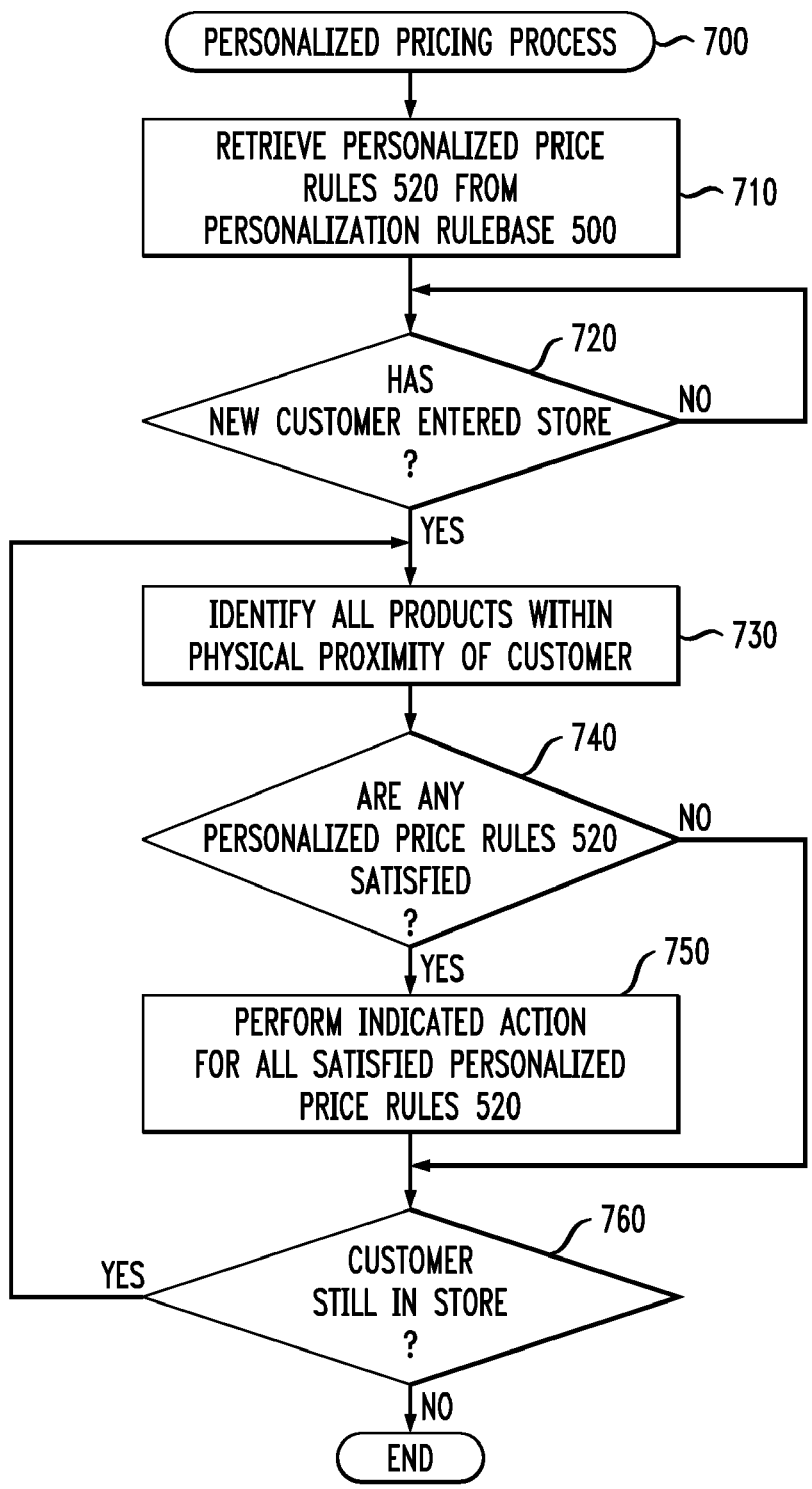
FIG. 7 is a flow chart describing an exemplary implementation of a personalized pricing process incorporating features of the present invention.

FIG. 7 is a flow chart describing an exemplary implementation of a personalized pricing process 700 incorporating features of the present invention. The personalized price process 700 presents applicable personalized pricing to customers 140 that are in physical proximity to certain products 110. As shown in FIG. 7, the personalized pricing process 700 initially retrieves the personalized price rules 520 from the personalization rulebase 500 (FIG. 5) during step 710. A test is performed during step 720 to determine if a new customer has entered the store. Once it is determined during step 720 that a new customer has entered the store, then all products within the physical proximity of the customer are continuously identified during step 730 (as the customer proceeds through the store).

A test is performed during step 740 to determine if there are any personalized price rules 520 that are satisfied. If there are no satisfied personalized price rules 520, program flow proceeds to step 770, discussed below.

If there are one or more satisfied personalized price rules 520, the indicated action for all satisfied personalized price rules 520 are implemented during step 750. A further test is performed during step 770 to determine if the customer is still in the store If the customer is still in the store, program control returns to step 730. If the customer is no longer in the store, program control terminates.

As is known in the art, the methods and apparatus discussed herein may be distributed as an article of manufacture that itself comprises a computer-readable medium having computer-readable code means embodied thereon. The computer-readable program code means is operable, in conjunction with a computer system to carry out all or some of the steps to perform one or more of the methods or create the apparatus discussed herein. The computer-readable medium may be a recordable medium (e.g., floppy disks, hard drive, optical disks such as a DVD, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk.

The functions and processes stored in the memory configure the processor to implement the methods, steps, and functions disclosed herein. The memory could be distributed or local and the processor could be distributed or singular. The memory could be implemented as an electrical, magnetic or optical memory, or any combination of these or other types of storage devices Moreover, the term "memory" should be construed broadly enough to encompass any information able to be read from or written to an address in the addressable space accessed by the processor. With this definition, information on a network, accessible through a network interface, is still within memory because the processor can retrieve the information from the network It should be noted that each distributed processor that makes up processor generally contains its own addressable memory space. It should also be noted that some or all of a computer system can be incorporated into an application-specific or general-use integrated circuit.

It is to be understood that the embodiments and variations shown and described herein are merely illustrative of the principles of this invention and that various modifications may be implemented by those skilled in the art without departing from the scope and spirit of the invention.

What is claimed is:

1. A method for determining a price of a product for a customer, comprising:
   obtaining a unique identifier of said product from an RFID tag of said product;
   obtaining a unique identifier of said customer from an RFID tag of said customer;
   determining a personalized price for said product in physical proximity to said customer, said personalized price providing a discount from a regular price, wherein said physical proximity is determined based on said customer RFID tag and said product RFID tag being within a field of the same RFID reader.

2. The method of claim 1, wherein said physical proximity is determined based on an identifier associated with said customer.

3. The method of claim 1, wherein a physical location of said customer is determined based on one or more of biometric information and said RFID tag associated with said product.

4. The method of claim 1, wherein said determining step determines said personalized price based on one or more personalized price rules.

5. The method of claim 1, further comprising the step of displaying a default price for said product until said personalized price is determined.

6. The method of claim 5, further comprising the steps of:
   establishing a difference quantity as a function of the default price and the personalized price; and
   presenting the difference quantity to said customer.

7. The method of claim 1, wherein said personalized price is based on one or more attributes of said customer.

8. The method of claim 7, wherein said attributes of said customer includes one or more of a status of whether said customer belongs to a reward program, a purchase history and customer preferences.

9. The method of claim 1, wherein said personalized price is based on one or more attributes of said product.

10. The method of claim 9, wherein said attributes of said product includes one or more of a quantity of said product and a selection of said product and one or more specified additional products.

11. The method of claim 1, wherein said physical proximity is determined based on physical contact between said customer and said at least one product.

12. The method of claim 1, wherein said physical proximity is determined based on said customer and said at least one product being within said field of the same RFID reader.

13. The method of claim 1, wherein said physical proximity is determined based on said customer and said at least one product being in the same sector of a given location.

14. A method for determining a message to present to a customer, comprising:
   obtaining a unique identifier of a product from an RFID tag of said product;
   obtaining a unique identifier of said customer from an RFID tag of said customer;
   determining a personalized message to present to said customer regarding said product in physical proximity to said customer, said personalized message based on one or more attributes of said customer, wherein said physical proximity is determined based on said customer RFID tag and said product RFID tag being within a field of the same RFID reader.

15. The method of claim 14, wherein said physical proximity is determined based on an identifier associated with said customer.

16. The method of claim 15, wherein a physical location of said customer is determined based on one or more of biometric information and said RFID tag associated with said product.

17. The method of claim 14, wherein said determining step determines said personalized message based on one or more personalized message rules.

18. The method of claim 14, wherein said attributes of said customer includes one or more of a status of whether said customer belongs to a reward program, a purchase history, and customer preferences.

19. The method of claim 14, wherein said personalized message is further based on one or more attributes of said product.

20. The method of claim 19, wherein said attributes of said product includes cautionary information.

21. The method of claim 14, wherein said personalized message provides one or more of dietary and cautionary information relevant to said customer and said at least one product.

22. The method of claim 14, wherein said physical proximity is determined based on one or more of physical contact between said customer and said at least one product, said customer and said at least one product being within said field of the same RFID reader, and said customer and said at least one product being in the same sector of a given location.

23. A system for determining a price of a product for a customer, said system comprising:
a memory; and
at least one processor, coupled to the memory, operative to:
obtain a unique identifier of said product from an RFID tag of said product;
obtain a unique identifier of said customer from an RFID tag of said customer;
determine a personalized price for said product in physical proximity to said customer, said personalized price providing a discount from a regular price, wherein said physical proximity is determined based on said customer RFID tag and said product RFID tag being within a field of the same RFID reader and wherein said personalized price is based on one or more attributes of said customer.

24. An article of manufacture for determining a price of a product for a customer, comprising a tangible and recordable machine readable storage medium excluding signals containing one or more programs which when executed implement the steps of: obtaining a unique identifier of said product from an RFID tag of said product; obtaining a unique identifier of said customer from an RFID tag of said customer; determining one or more of a personalized price and a personalized message for at least one product in physical proximity to said customer, said personalized price providing a discount from a regular price and said personalized message based on one or more attributes of said customer, wherein said physical proximity is determined based on said customer RFID tag and said product RFID tag being within a field of the same RFID reader.

25. A system for determining a message to present to a customer, said system comprising:
a memory; and
at least one processor, coupled to the memory, operative to:
obtaining a unique identifier of a product from an RFID tag of said product;
obtaining a unique identifier of said customer from an RFID tag of said customer;
determining a personalized message to present to said customer regarding said product in physical proximity to said customer, said personalized message based on one or more attributes of said customer, wherein said physical proximity is determined based on said customer RFID tag and said product RFID tag being within a field of the same RFID reader.

* * * * *